United States Patent [19]

Young

[11] Patent Number: 5,072,958

[45] Date of Patent: Dec. 17, 1991

[54] HAND TRUCK

[76] Inventor: Horace J. Young, 2603, 1100 - 8 Avenue SW., Calgary, Alberta, Canada, T2P 3T9

[21] Appl. No.: 656,760

[22] Filed: Feb. 19, 1991

[51] Int. Cl.⁵ .............................................. B62B 1/04
[52] U.S. Cl. .................................... 280/40; 280/655; 280/47.29
[58] Field of Search .................... 280/38, 39, 40, 645, 280/646, 652, 655, 47.17, 47.18, 47.23, 47.24, 47.27, 47.29, 47.33

[56] References Cited

U.S. PATENT DOCUMENTS

| 1,462,133 | 7/1923 | Glock | 280/39 |
| 2,729,460 | 1/1956 | Forman | 280/40 |
| 3,043,603 | 7/1962 | Major, Sr. | 280/40 |
| 3,241,852 | 3/1966 | Muller et al. | 280/40 |
| 3,831,958 | 8/1974 | Keaton | 280/646 |
| 4,448,434 | 5/1984 | Anderson | 280/47.29 X |
| 4,506,897 | 3/1985 | Libit | 280/655 X |
| 4,659,096 | 4/1987 | Leimgruber | 280/39 |
| 4,989,889 | 2/1991 | Server Perez | 280/40 |
| 4,993,727 | 2/1991 | Von Braucke et al. | 280/40 |

FOREIGN PATENT DOCUMENTS

| 921065 | 2/1973 | Canada | 280/40 |
| 1163286 | 3/1984 | Canada | 280/40 |
| 2213573 | 5/1973 | Fed. Rep. of Germany | 280/646 |
| 7513895 | 6/1977 | Netherlands | 280/40 |
| 1184731 | 10/1985 | U.S.S.R. | 280/655 |
| 1449440 | 1/1989 | U.S.S.R. | 280/655 |

Primary Examiner—Andres Kashnikow
Assistant Examiner—Brian L. Johnson
Attorney, Agent, or Firm—George Haining Dunsmuir

[57] ABSTRACT

In general, hand trucks are heavy metal devices which are somewhat expensive and difficult to manipulate. A simple, readily portable, collapsible hand truck includes a tubular rectangular frame, the corners of which are interconnected by similar pairs of upper and lower, inverted L-shaped brackets, the upper brackets pivotally supporting a tubular, generally C-shaped handle and the lower brackets pivotally supporting a tubular, generally C-shaped load supporting platform; a pair of bifurcated yokes rotatably mounted on the frame sides above the lower brackets for supporting a pair of wheels; and a crossbar pivotally mounted on the inner end of the axle of one wheel for rotation from a vertical storage position to a horizontal use position engaging the yoke carrying the other wheel, whereby the yokes and wheels can be releasably latched in the parallel use position perpendicular to the frame.

10 Claims, 4 Drawing Sheets

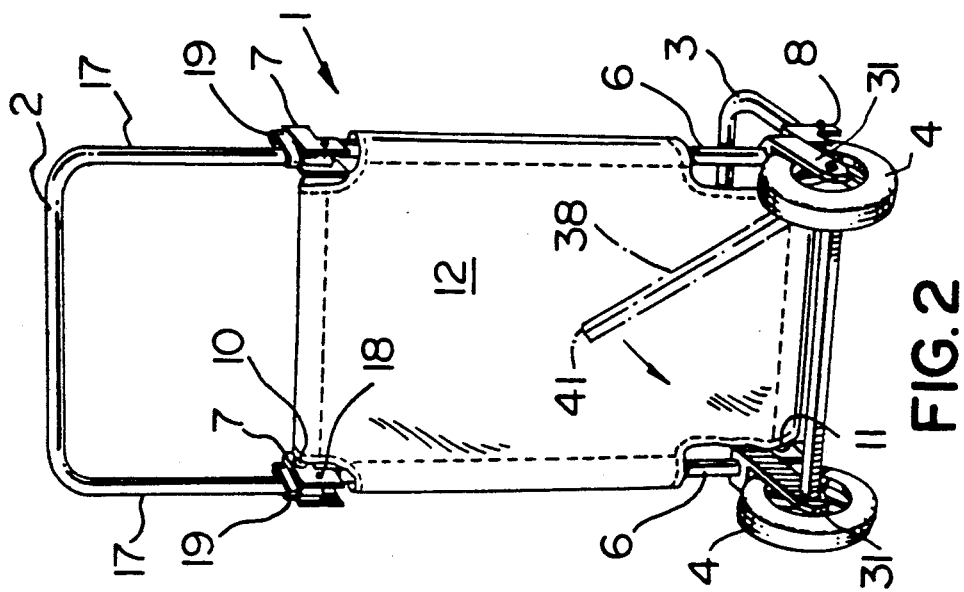
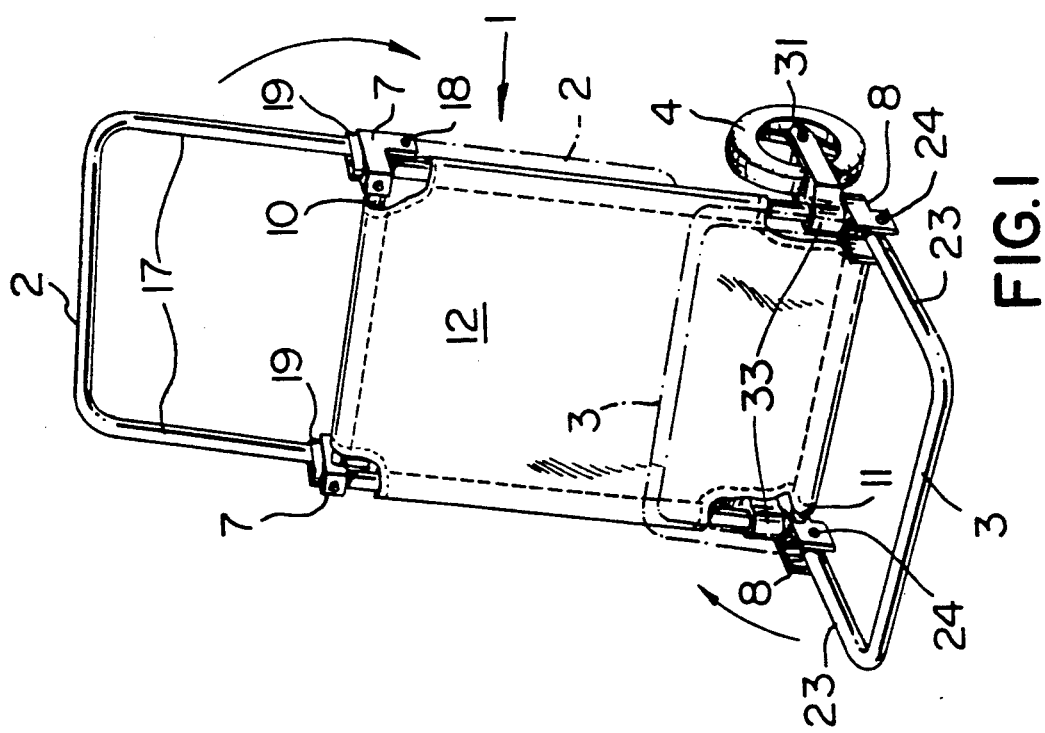

5,072,958

HAND TRUCK

BACKGROUND OF THE INVENTION

This invention relates to a hand truck, and in particular to a collapsible hand truck.

In general, currently available hand trucks are solid, somewhat heavy metal devices, which are relatively expensive to produce and difficult to manipulate. Examples of collapsible, more readily portable hand trucks or dollies are disclosed by Canadian Patents Nos. 921,065, which issued to Walter J. Curry on Feb. 13, 1973 and 1,163,286, which issued to Frank E. Taylor on Mar. 6, 1984, and U.S. Pat. Nos. 2,729,460, which issued to J. R. Forman on Jan. 3, 1956; 3,043,603, which issued to R. J. Major, Sr. on July 10, 1962; 4,448,434, which issued to M. B. Anderson on May 15, 1984 and 4,659,096, which issued to J. Leimgruber on Apr. 21, 1987. While some of the patented devices go a long way toward solving the problem of heavy, awkward and expensive hand trucks, some of the patented structures are somewhat complicated and consequently would be costly to produce and/or difficult to manipulate.

The object of the present invention is to provide an alternate solution to the problems outlined above by providing a relatively simple, collapsible hand truck, which is lightweight and easy to manipulate between the use and storage positions.

SUMMARY OF THE INVENTION

Accordingly, the present invention relates to a collapsible hand truck comprising skeletal frame means, said frame means including parallel sides, upper bracket means on the top of each side, lower bracket means on the bottom of each side, and top end means extending between said upper bracket means; handle means rotatable on said top bracket means for movement between a storage position against said frame means and a use position above said frame means; platform means for carrying a load rotatable on said lower bracket means for movement between a storage position against said frame and a use position perpendicular to said frame; yoke means pivotally mounted on each said side for rotation between a storage position parallel to said frame means and a use position perpendicular to said frame means; wheel means carried by each said yoke means; and crossbar means pivotally connected to one said yoke means for rotation between a horizontal use position against the other said yoke means for maintaining the wheel means parallel in the use position, and a raised, folded position permitting rotation of said yoke means and wheel means towards each other to the collapsed, storage position.

BRIEF DESCRIPTION OF THE DRAWINGS

The invention will be described in greater detail with reference to the accompanying drawings, which illustrate a preferred embodiment of the invention, and wherein:

FIG. 1 is a schematic, isometric view of a hand truck in accordance with the present invention in the use position;

FIG. 2 is a schematic, isometric view of the hand truck of FIG. 1 in the partially folded position;

DESCRIPTION OF THE PREFERRED EMBODIMENTS

Figure 4:
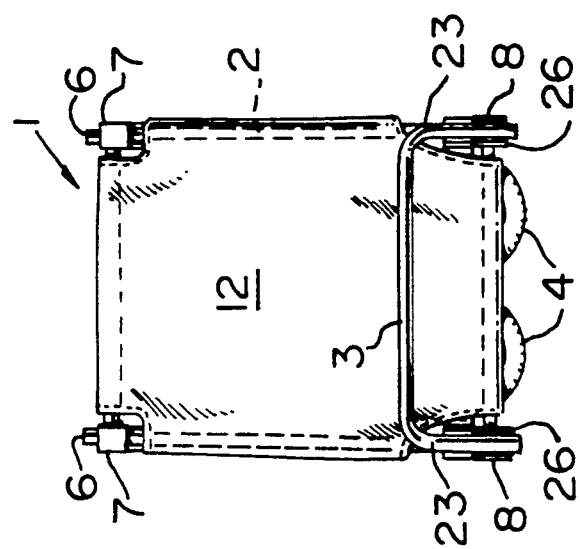
FIG. 4 is a front elevational view of the hand truck of FIGS. 1 and 2 in the folded position.

With reference to the drawings, the basic elements of the hand truck of the present invention include a skeletal, rectangular frame generally indicated at 1, a generally C-shaped handle 2 pivotally connected to the upper end of the frame 1, a generally C-shaped platform 3 pivotally connected to the lower end of the frame 1, and a pair of wheels 4 carrying the frame 1.

The frame 1 is defined by a pair of parallel, tubular, metal sides 6 with inverted L-shaped brackets 7 and 8 at their top and bottom ends, respectively. The brackets 7 and 8 are interconnected by upper and lower crossbars 10 and 11, respectively which define the ends of the frame. A cover 12 is provided on the frame 1. The sides and ends of the cover 12 are wrapped around the frame sides 6 and the crossbars 10 and 11, and sewn.

Figure 3:
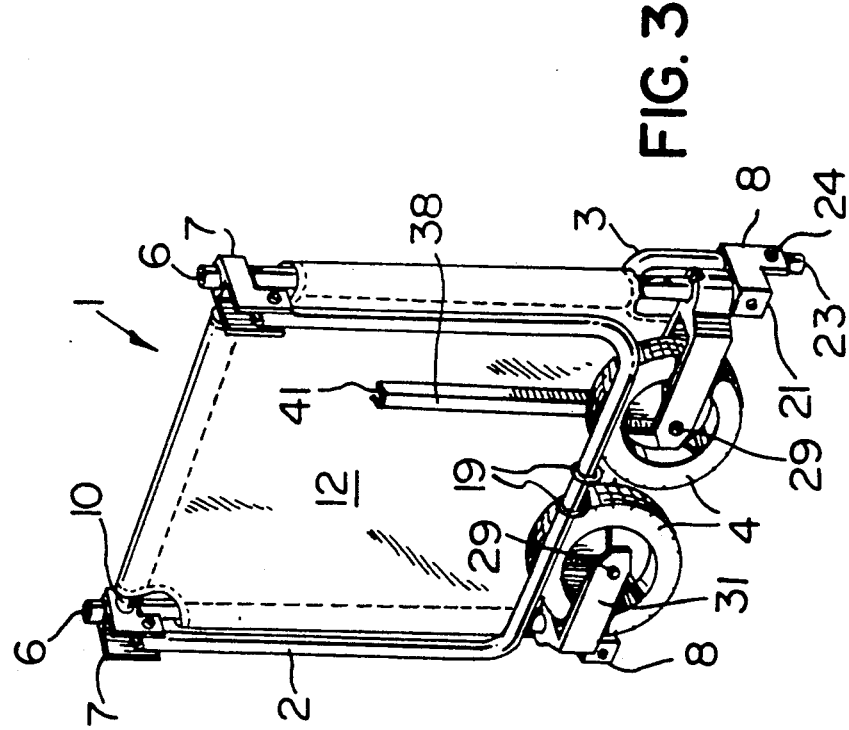
FIG. 3 is a schematic, isometric view of the hand truck of FIGS. 1 and 2 in the folded, storage position as seen from the rear.
Figure 5:
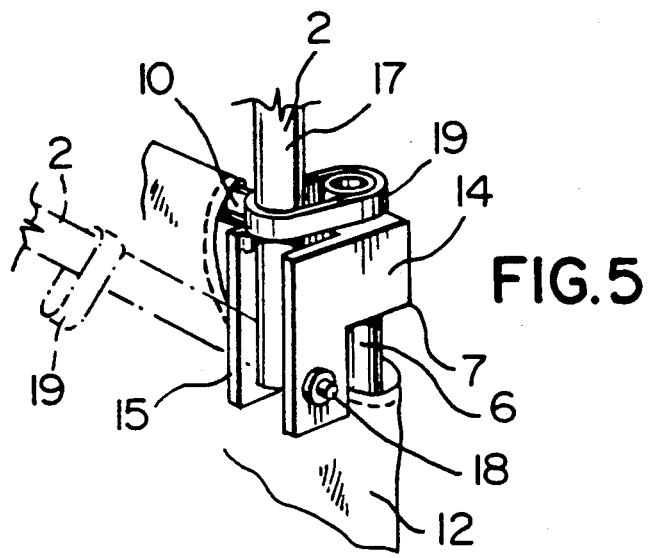
FIG. 5 is an isometric view of one top corner of the frame of the hand truck of FIGS. 1 to 3.

As best shown in FIG. 5, the solid horizontal arm 14 of each of the upper brackets 7 extends rearwardly. Thus, the bifurcated vertical arm 15 of such bracket 7 is located behind the side 6 for pivotally supporting the handle 2. The bottom end of each side 17 of the handle 2 extends downwardly through the bifurcated vertical arm 15 of the bracket 7. The handle 2 is pivotally mounted on pins 18 extending between the sides of the vertical arm 15 of the bracket 7 for rotation between the use position (FIGS. 1, 2 and solid lines in FIG. 5) and the non-use or storage position (FIGS. 3 and 4). As best shown in FIG. 5, the handle 2 releasably latched in position by a latch device defined by a pair of oval rings or loops 19 which are freely slidable on the handle. When the handle 2 is rotated to the use position (FIGS. 1, 2 and 5), the rings 19 are slid into position on the top free ends of the frame sides 6.

The brackets 8 on the bottom end of the frame 1 extend forwardly from the frame. The bottom end of each side 6 and the crossbar 11 extend into the solid horizontal arm 21 of the bracket 8. The sides 23 of the platform 3 are pivotally mounted on pins 24 extending between the sides of the bifurcated, front, vertical arm 26 of the brackets 8. The platform 3 is maintained in the storage position by a pair of small projections or lugs 27 (FIG. 6) on the inner surfaces of the sides of the bifurcated, vertical arms 26 of the brackets 8. The lugs 27 impede, but do not prevent rotation of the platform 3 around the axis of the pins 24. When the platform 2 is rotated to the use position, the ends of the sides 23 thereof come to rest against the blocks defining the solid arms 21 of the brackets 8, i.e. the solid arms 21 define stops for limiting movement of the platform 3.

Figure 6:
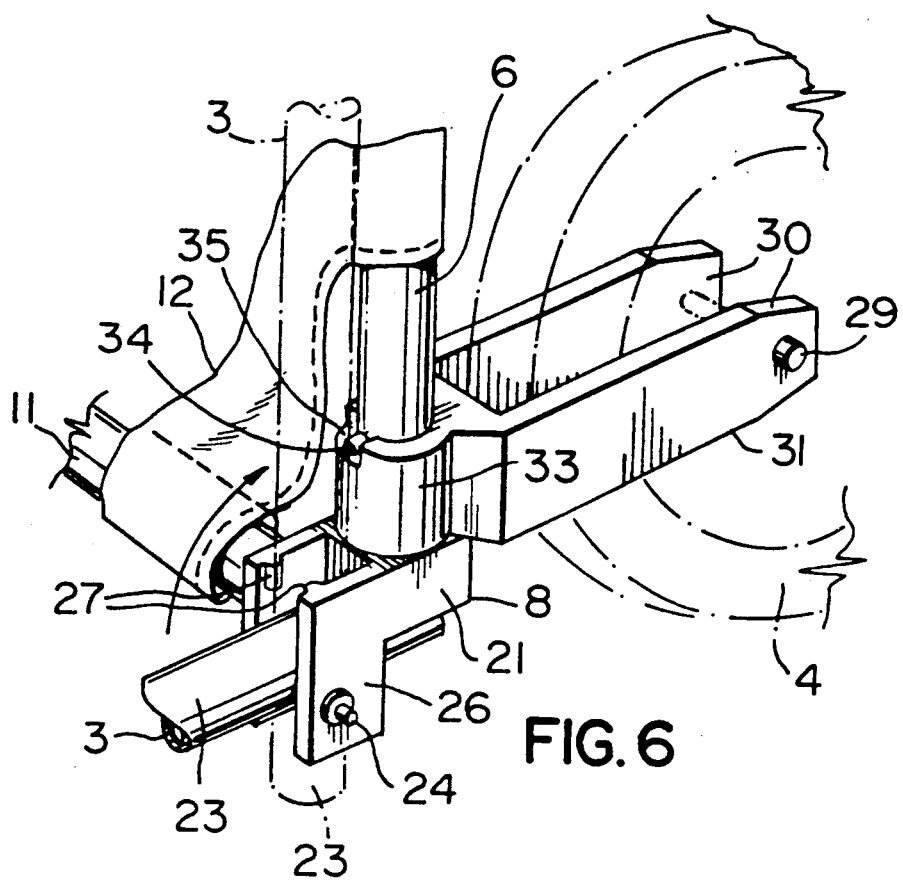
FIG. 6 is an isometric, partly sectioned view of a bottom corner of the frame of the hand truck of FIGS. 1 to 3.

As best shown in FIG. 6, the wheels 4 are rotatably mounted on axles defined by rods 29 extending between the arms 30 of generally U-shaped yokes 31. The other end of each yoke 31 is defined by a sleeve 33 for rotatably mounting the yoke on the bottom end of a frame side 6 above the bracket 8. Rotation of the yoke 31 is limited by a pin 34 extending out of each frame side 6 and into a rectangular notch 35 in the top end of the sleeve 33. This arrangement permits rotation of the yokes 31 and the wheels 4 through approximately 90 degrees between the use position (FIGS. 1, 2 and 6) in which the yoke and wheels are perpendicular to the frame 2 and the storage position (FIGS. 3 and 4) in which the yoke and wheels are more or less parallel to the frame 2.

Figure 7:
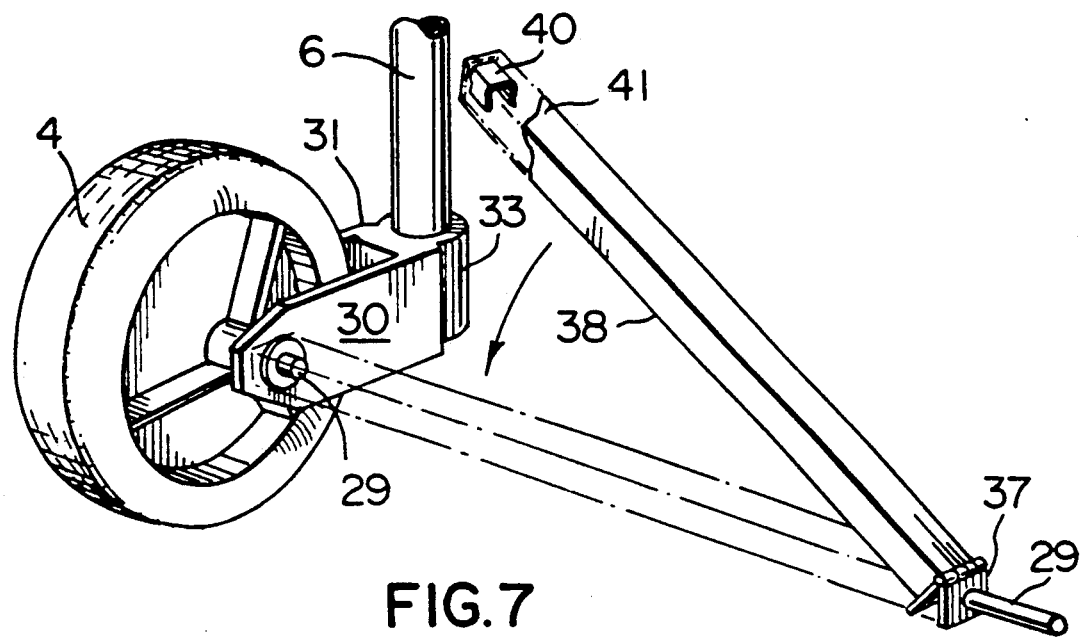
FIG. 7 is a schematic, isometric view of one wheel and a latch used in the hand truck of FIGS. 1 and 2.

The wheels 4 are releasably latched in the use position by a second latch device (FIG. 7), which includes a hinge 37 on the inner end of one of the rods 29. The hinge 37 carries one end of a crossbar 38, which has an inverted U-shaped cross section. An inverted U-shaped spring clip 40 is provided in the other, free end 41 of the crossbar 38. When the hand truck is unfolded to the erect or use position, the crossbar 38 is rotated around the hinge pin axis from the vertical, storage position to the horizontal, use position, so that the clip 40 engages the inner end of the other rod 29.

Figure 8:
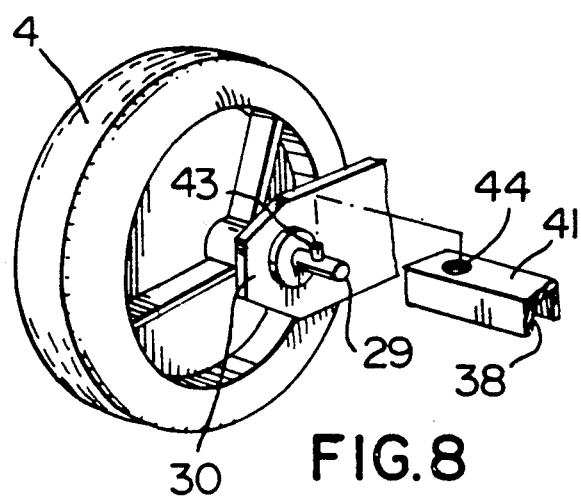
FIG. 8 is a schematic, isometric view of a portion of a second form of latch used in the hand truck of FIGS. 1 and 2.

A third form of wheel latch device (FIG. 8) includes a small pin 43 on the inner end of the rod 29 for entering a hole 44 in the free end 41 of the crossbar 38. In either case, the wheels 4 are releasably latched in the use position, simple rotation of the bar 38 serving to release the wheels and yokes for folding to the storage position.

Thus, there has been described a relatively simple, hand truck, which is folded or unfolded between the storage and use positions. The use of a single bracket design for each of the four corners of the frame, and tubular sides and ends for the frame results in economical and lightweight construction.

What is claimed is:

1. A collapsible hand truck comprising skeletal frame means, said frame means including parallel sides, upper bracket means on a top of each side, lower bracket means on a bottom of each side, and top end means connected with and extending between said upper bracket means; handle means rotatable connected on said top bracket means for rotation to a use position above said frame means; platform means for carrying a load and rotatably connected on said lower bracket means for movement between a storage position against said frame means and a use position perpendicular to said frame means; yoke means pivotally mounted on each said side for rotation between a storage position parallel to said frame means and a use position perpendicular to said frame means; wheel means carried by each said yoke means; and crossbar means pivotally connected to one said yoke means for rotation between a horizontal use position in engagement against the other said yoke means for maintaining the wheel means parallel in the use position, and a raised, folded position permitting rotation of said yoke means and wheel means towards each other to the collapsed, storage position.

2. A hand truck according to claim 1 wherein said frame means includes bottom end means extending between said lower bracket means.

3. A hand truck according to claim 2 wherein each said upper and lower bracket means includes inverted L-shaped body means; and block means defining at least can outer free end of the horizontal arm of said body means for receiving one end of one said parallel side.

4. A hand truck according to claim 3 wherein said body means includes a bifurcated vertical arm for pivotally supporting both said handle means an said platform means.

5. A hand truck according to claim 4, wherein the vertical arm of said upper bracket means extends substantially rearwardly of said frame means for pivotally supporting said handle means for rotation between a non-use position against the rear of said frame means and a use position above said frame means; and the vertical arm of said lower bracket means extends forwardly of said frame means for pivotally supporting said platform means for rotation between a non-use position against the front of said frame means and a use position perpendicular thereto.

6. A hand truck according to claim 5, including first movable latch means for releasably retaining said handle means in the use position; and second movable latch means for releasably retaining said platform means in the use position.

7. A hand truck according to claim 6, including third movable latch means for releasably retaining said crossbar means against said other yoke means.

8. A hand truck according to claim 7, wherein said third movable latch means includes first axle means in said other yoke means supporting one said wheel means, said first axle means extending beyond an inner side of said yoke means; and spring clip means in said crossbar means for releasably engaging an inner free end of said first axle means.

9. A hand truck according to claim 7, wherein said third movable latch means includes first axle means in said other yoke means supporting one said wheel means, said first axle means extending beyond an inner side of said yoke means and including a pin means extending upwardly therefrom; and an opening in said crossbar means for receiving said pin means, 10. A hand truck according to claim 8 including second axle means in said one yoke means supporting a second said wheel means, said second axle means extending beyond the inner side of said one yoke means; and hinge means on an inner free end of said second axle means pivotally supporting said crossbar means.

* * * * *